US008909619B1

(12) United States Patent
Riley et al.

(10) Patent No.: US 8,909,619 B1
(45) Date of Patent: Dec. 9, 2014

(54) PROVIDING SEARCH RESULTS TOOLS (75) Inventors: Patrick F. Riley, Sunnyvale, CA (US); Yujing Zeng, Cupertino, CA (US); Dale K. Neal, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 133 days.

(21) Appl. No.: 13/020,652

(22) Filed: Feb. 3, 2011

(51) Int. Cl.
G06F 17/30 (2006.01)

(52) U.S. Cl.
USPC .......................................... 707/722

(58) Field of Classification Search
CPC ................ G06F 17/30867; G06F 17/3053
USPC .................... 707/722, 727, 728, 732
See application file for complete search history.

(56) References Cited

U.S. PATENT DOCUMENTS

| 7,720,791 | B2 | 5/2010 | Hyder et al. | |
|---|---|---|---|---|
| 7,801,899 | B1 | 9/2010 | Spitkovsky | |
| 8,155,986 | B2* | 4/2012 | Deljo et al. | 705/6 |
| 8,161,044 | B2* | 4/2012 | Blackwell et al. | 707/731 |
| 2003/0220912 | A1 | 11/2003 | Fain et al. | |
| 2006/0031214 | A1* | 2/2006 | Solaro et al. | 707/4 |
| 2006/0036581 | A1 | 2/2006 | Chakrabarti et al. | |
| 2006/0149625 | A1 | 7/2006 | Koningstein | |
| 2006/0248073 | A1* | 11/2006 | Jones et al. | 707/5 |
| 2007/0011020 | A1 | 1/2007 | Martin | |
| 2008/0133540 | A1 | 6/2008 | Hubbard et al. | |
| 2009/0100036 | A1 | 4/2009 | Bedrax-Weiss et al. | |
| 2009/0112836 | A1* | 4/2009 | Ishitani et al. | 707/5 |
| 2009/0198675 | A1* | 8/2009 | Mihalik et al. | 707/5 |
| 2010/0251145 | A1* | 9/2010 | Leppert et al. | 715/762 |

FOREIGN PATENT DOCUMENTS

KR 10-2001-0104871 11/2001

WO WO 2009/048818 4/2009

OTHER PUBLICATIONS

Bennett, P., et al., "Probabilistic Combination of Text Classifiers Using Reliability Indicators: Models and Results", Proceedings of the 25th Annual International ACM SIGIR Conference on Research and Development in Information Retrieval, 2002, ACM, New York, pp. 207-214.
Chekuri, C., et al, "Web Search Using Automatic Classification", Proceedings of the WWW-96, 6th International Conference on the World Wide Web, 1996, 11 pages.
Chen, H., et al., "Bringing Order to the Web: automatically Categorizing Search Results", Proceedings of the SIGCHI Conference on Human Factors in Computing systems, 2000, ACM, New York, pp. 145-152.
Dumais, S., et al., "Hierarchical Classification of Web Content", Proceedings of the 23rd Annual International ACM SIGIR Conference on Research and Development in Information Retrieval, 2000, ACM, New York, pp. 256-263.
International Preliminary Report on Patentability from International Application No. PCT/US2008/078818 mailed Mar. 30, 2009, 7 pages.
International Search Report from International Application No. PCT/US2008/078818 mailed Mar. 30, 2009, 12 pages.

* cited by examiner

Primary Examiner — Khanh Pham
(74) Attorney, Agent, or Firm — Fish & Richardson P.C.

(57) ABSTRACT

The subject matter of this specification can be embodied in, among other things, a method that includes obtaining, in response to a determination that one or more tools are relevant to a search query or search results, code for presenting user interface controls with the search results, wherein selection of a particular presented user interface control results in performing an operation corresponding to a particular tool for manipulating the search results, and wherein the code is configured to present the user interface controls for the determined tools more prominently than user interface controls for one or more others of the tools that were not determined to be relevant to the search query or the search results.

15 Claims, 7 Drawing Sheets

PROVIDING SEARCH RESULTS TOOLS

TECHNICAL FIELD

This instant specification relates to providing search results tools.

BACKGROUND

Search engines enable users to search for web pages and other content on the Internet. Generally, users can submit queries to a search engine system. For example, a user may submit a query using a web browser at a client computing device. The browser may send the query as a hypertext transfer protocol (HTTP) request. The HTTP request containing the query may be sent to a server. The server, in turn, sends the request onto a search engine system. The search engine system uses the query to identify web pages and other content that satisfy the query. The search engine system then returns a set of search results to the server. The server generates a page to display the set of search results to the user. For example, the page may be encoded in hypertext markup language (HTML). The server then sends the page to the client as an HTTP response. Finally, the web browser renders the page at the client computing device for display to the user.

SUMMARY

In general, this document describes identifying and providing tools for manipulating search results. If a particular tool for manipulating search results is often selected by users for a particular query, then that tool can be presented to subsequent users that request search results for that query. If the search results for the query include a number of search results having a particular type (e.g., product or shopping related search results) that is associated with a particular tool, then that tool can be presented to the user that requested the search results. If the search results include a number of search results having a particular date or range of dates, or the query was requested a number of times on a particular date or range of dates, then a time filter tool can be presented. After determining which tools are relevant for a query, user interface controls for invoking those tools are presented with the search results at a user's client computing device. One or more of the user interface controls for the relevant tools can also be presented in an ordered list based on level of relevance.

In one aspect, a computer-implemented method includes analyzing a search query or search results responsive to the search query to determine that one or more tools, from a set of multiple tools for manipulating the search results, are relevant to the search query or the search results. The method further includes obtaining, in response to the determination that the one or more tools are relevant to the search results, code for presenting user interface controls with the search results. Selection of a particular presented user interface control results in performing an operation corresponding to a particular tool for manipulating the search results. The code is configured to present the user interface controls for the determined tools more prominently than user interface controls for one or more others of the tools that were not determined to be relevant to the search query or the search results.

Implementations can include any, all, or none of the following features. The method includes providing a search results page including the code to a computing device. More prominent presentation of the user interface controls for the determined tools includes not presenting the user interface controls for the other tools. More prominent presentation of the user interface controls for the determined tools includes placement of the user interface controls for the determined tools at a higher ordered position than a position of the user interface controls for the other tools. The method includes receiving a user selection of at least one of the presented user interface controls and, in response to receiving the user selection, performing the operation for the corresponding one of the determined tools. Analyzing the search query and the search results includes analyzing previous user selections of the tools for the search query and ordering the user interface controls for the determined tools based on the previous user selections. At least one tool in the determined tools is configured to filter the search results based on a range of time, and wherein analyzing the search query and the search results includes analyzing dates associated with the search results to determine that the range of time is relevant to the search query. Analyzing the dates associated with the search results includes identifying a time period having a proportionally higher amount of the search results than one or more other time periods. Analyzing the search query and the search results includes determining that a threshold number of a particular type of search result occur in an ordered list of the search results, and wherein at least one tool in the determined tools is configured to modify one or more positions of the particular type of search result in the list. Determining that the threshold number of the particular type of search result occur includes determining that the threshold number of the particular type of search result occur at low positions in the list, and wherein the tool is configured to increase one or more positions of the particular type of search result in the list. Determining that the threshold number of the particular type of search result occur includes determining that the threshold number of the particular type of search result occur at high positions in the list, and wherein the tool is configured to decrease one or more positions of the particular type of search result in the list.

In one aspect, a system includes a computer-readable medium that stores instructions. The system further includes data processing apparatus configured to execute the instructions and perform operations including analyzing a search query or search results responsive to the search query to determine that one or more tools, from a set of multiple tools for manipulating the search results, are relevant to the search query or the search results. The operations further include obtaining, in response to the determination that the one or more tools are relevant to the search query or the search results, code for presenting user interface controls with the search results. Selection of a particular presented user interface control results in performing operations corresponding to a particular tool for manipulating the search results. The code is configured to present the user interface controls for the determined tools more prominently than user interface controls for one or more others of the tools that were not determined to be relevant to the search query or the search results.

Implementations can include any, all, or none of the following features. The operations include providing a search results page including the code to a computing device. More prominent presentation of the user interface controls for the determined tools includes not presenting the user interface controls for the other tools. More prominent presentation of the user interface controls for the determined tools includes placement of the user interface controls for the determined tools at a higher ordered position than a position of the user interface controls for the other tools. The operations include receiving a user selection of at least one of the presented user interface controls and, in response to receiving the user selection, performing the operation for the corresponding one of the determined tools. Analyzing the search query and the search results includes analyzing previous user selections of the tools for the search query and ordering the user interface controls for the determined tools based on the previous user selections. At least one tool in the determined tools is configured to filter the search results based on a range of time, and wherein analyzing the search query and the search results includes analyzing dates associated with the search results to determine that the range of time is relevant to the search query. Analyzing the dates associated with the search results includes identifying a time period having a proportionally higher amount of the search results than one or more other time periods. Analyzing the search query and the search results includes determining that a threshold number of a particular type of search result occur in an ordered list of the search results, and wherein at least one tool in the determined tools is configured to modify one or more positions of the particular type of search result in the list. Determining that the threshold number of the particular type of search result occur includes determining that the threshold number of the particular type of search result occur at low positions in the list, and wherein the tool is configured to increase one or more positions of the particular type of search result in the list. Determining that the threshold number of the particular type of search result occur includes determining that the threshold number of the particular type of search result occur at high positions in the list, and wherein the tool is configured to decrease one or more positions of the particular type of search result in the list.

In one aspect, a computer program product, encoded on a computer-readable medium, operable to cause one or more processors to perform operations including analyzing a search query and search results responsive to the search query to determine that one or more tools, from a set of multiple tools for manipulating the search results, are relevant to the search query or the search results. The operations further include obtaining, in response to the determination that the one or more tools are relevant to the search query or the search results, code for presenting user interface controls with the search results. Selection of a particular presented user interface control by a user results in performing an operation corresponding to a particular tool for manipulating the search results. The code is configured to present the user interface controls for the determined tools more prominently than user interface controls for one or more others of the tools that were not determined to be relevant to the search query or the search results.

Implementations can include any, all, or none of the following features. The operations include providing a search results page including the code to a computing device. More prominent presentation of the user interface controls for the determined tools includes not presenting the user interface controls for the other tools. More prominent presentation of the user interface controls for the determined tools includes placement of the user interface controls for the determined tools at a higher ordered position than a position of the user interface controls for the other tools. The operations include receiving a user selection of at least one of the presented user interface controls and, in response to receiving the user selection, performing the operation for the corresponding one of the determined tools. Analyzing the search query and the search results includes analyzing previous user selections of the tools for the search query and ordering the user interface controls for the determined tools based on the previous user selections. At least one tool in the determined tools is configured to filter the search results based on a range of time, and wherein analyzing the search query and the search results includes analyzing dates associated with the search results to determine that the range of time is relevant to the search query. Analyzing the dates associated with the search results includes identifying a time period having a proportionally higher amount of the search results than one or more other time periods. Analyzing the search query and the search results includes determining that a threshold number of a particular type of search result occur in an ordered list of the search results, and wherein at least one tool in the determined tools is configured to modify one or more positions of the particular type of search result in the list. Determining that the threshold number of the particular type of search result occur includes determining that the threshold number of the particular type of search result occur at low positions in the list, and wherein the tool is configured to increase one or more positions of the particular type of search result in the list. Determining that the threshold number of the particular type of search result occur includes determining that the threshold number of the particular type of search result occur at high positions in the list, and wherein the tool is configured to decrease one or more positions of the particular type of search result in the list.

The systems and techniques described here may provide one or more of the following advantages. First, a system can automatically present a reduced list of tools for manipulating search results. Second, a system can provide a reduced list of tools for manipulating search results that are likely to be selected by a user. Third, a system can provide a reduced list of tools for manipulating search results that are sorted by likelihood of being selected by a user.

The details of one or more implementations are set forth in the accompanying drawings and the description below. Other features and advantages will be apparent from the description and drawings, and from the claims.

DETAILED DESCRIPTION

This document describes systems and techniques for identifying and providing search results tools. The search results tools can be used by a user operating a web browser application to manipulate a list of search results. The system determines that one or more search result tools from a set of multiple search result tools are relevant to the search results, a search query used to generate the search results, and/or other information related to the search query and/or the search results. The system generates code for presenting the determined search results tools more prominently than the other search results tools that were not determined to be relevant.

Figure 1:
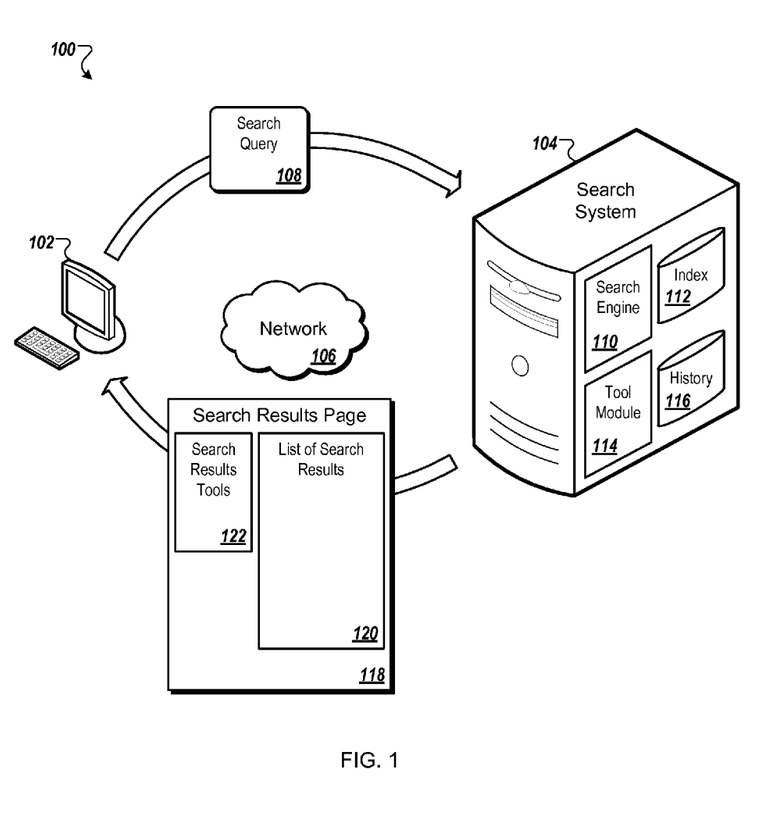
FIG. 1 is a schematic diagram that shows an example of a system for providing search results tools.

FIG. 1 is a schematic diagram that shows an example of a system 100 for identifying and providing tools for manipulating search results. The system 100 includes a computing device 102 in communication with a search system 104 over a network 106, such as the Internet. A user at the computing device 102 inputs a search query 108, such as the term "transformers," to a browser application. The computing device 102 sends the search query 108 to the search system 104. The search system 104 includes a search engine 110 that receives the search query 108. The search engine 110 performs a search on an index 112 of content from sources on the network 106 to identify search results that satisfy one or more conditions in the search query 108. For example, the search results can include links to and/or portions of content from web pages, video, and other media from the network 106.

The search system 104 also includes a search results tool module 114 that identifies one or more tools that are relevant to manipulating the search results. For example, the search results tool module 114 can determine that the user is likely to use one or more of the tools to manipulate the search results. In some implementations, the search results tool module 114 can access a history 116 of previous user selections of tools for the search query 108 to make this determination. For example, the search results tool module 114 can use the history 116 to determine that users select a page images tool more frequently than other search results tools for the query "transformers."

The search system 104 sends a search results page 118 to the computing device 102 in response to the search query 108. The search results page 118 includes a list 120 of the search results and user interface controls for one or more search results tools 122, such as the page images tool, that the search results tool module 114 identified as being relevant to the search results. Subsequently, the user can select one of the search results tools 122 to manipulate the search results presented in the list 120. For example, the user can select the page images tool to add images to the list 120 from the web pages that are referenced in the search results.

Figure 2:
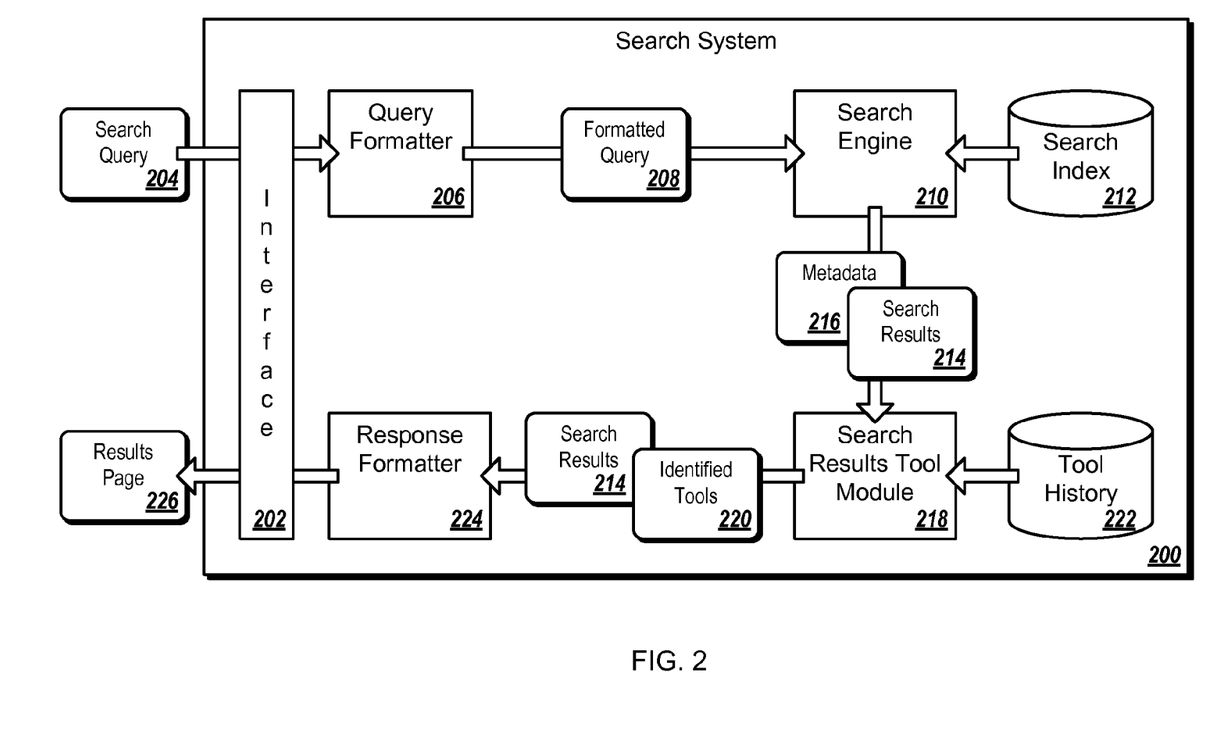
FIG. 2 is a block diagram that shows an example of a search system for providing search results tools.

FIG. 2 is a block diagram that shows an example of a search system 200 for identifying and providing search results tools. The search system 200 includes an interface 202 for receiving a search query 204 over a network, such as the network 106. A query formatter 206 processes the search query 204. For example, the query formatter 206 can identify search terms (e.g., "transformers") and search operators (e.g., logical operators, an exclusion operator, or a wildcard operator) in the search query 204. In another example, the query formatter 206 can identify other queries that are similar to the search query 204. Similar queries can include, for example, queries with one or more search terms in common with the search query 204 and/or queries with corrections for common misspellings in the search query 204. In another example, the query formatter 206 can remove stop words or symbols from the search query 204. After processing the search query 204, the query formatter 206 provides at least one formatted query 208 to a search engine 210.

The search engine 210 uses the formatted query 208 to perform a search on an index 212 of content from the network. The search identifies multiple search results 214 that satisfy one or more conditions in the formatted query 208. For example, if the search terms include the term "transformers," the search results 214 can include links to and/or portions of web pages, video, and other media from the network that are related to the term "transformers," such as product web pages for the popular TRANSFORMERS toys from HASBRO, a web page from a movie database for the TRANSFORMERS movie from 2007 directed by Michael Bay, and a news web page regarding casting of John Malkovich and Frances McDormand in a third movie in the TRANSFORMERS series.

The search engine 210 can also identify a plurality of metadata 216 for the search results 214 and/or the search query 204. In some implementations, the metadata 216 can include dates, locations, and/or languages associated with one or more of the search results 214. For example, the search engine 210 and/or a crawler that builds the index 212 can identify a date for a search result using a date that the content of the search result was first indexed. In another example, the search engine 210 and/or the crawler can identify the dates, locations, and/or languages using one or more of information in the displayed content, in hidden content, or in other metadata for the content. Hidden content can include, for example, non-displayed hypertext markup language (HTML) tags and/or HTML attributes. Other content metadata can include, for example, a file creation date for a web page. Another example of other content metadata can include a lookup of an Internet Protocol (IP) address or top level domain (TLD) of the web page in a database that relates addresses and/or TLDs to geographic locations (e.g., IP address 71.195.25.152 is located in Osseo, Minn.) and/or languages (e.g., TLD .br is associated with the Portuguese language).

The metadata 216 can, in some implementations, also include an indication of the type of content for one or more of the search results 214. Types of content can include, for example, images, news, books, videos, blogs, business listings, products, micro-blogs, and discussions. The search system 200 can identify the types of the content using an explicit reference, such as an HTML img tag for the image content type or an HTML video, embed, and/or object tag for the video content type. In addition, HTML attributes can be used to identify the video content type For example, either a data attribute for an object tag having an attribute value with an swf extension or an src attribute for an embed tag having an attribute value with an swf file extension can be used to indicate that the media is ADOBE FLASH video. In some implementations, a type of content can be identified by the service that provides the content. For example, the search system 200 can identify search results from a video sharing site, such as YOUTUBE, as having a video content type. In another example, the search system 200 can identify search results from sites that publish a site feed or syndication, such as Really Simple Syndication (RSS) or Atom, as having a blog content type. In yet another example, the search system 200 can identify search results from micro-blog sites, such as sites that provide short status messages, as having a micro-blog content type.

In some implementations, a crawler stores the identified metadata in the index 212 prior to the search engine 210 performing the search. At some later time, the search engine 210 then retrieves the metadata 216 from the index 212 along with the search results 214 identified during the search. Next, the search engine 210 provides the search results 214 and the metadata 216 to a search results tool module 218.

The search results tool module 218 analyzes the search query 204, the search results 214, or both to determine that one or more tools 220 from a set of multiple tools are relevant to the search results 214. Analyzing the search query 204 or the search results 214 can also include analyzing the metadata 216. In some implementations, being relevant to the search results 214 indicates that a user is likely to make use of the determined tools while reviewing the search results 214.

The search results tool module 218 can analyze a particular number of the search results 214 rather than the entire set of the search results 214. For example, the search results tool module 218 can analyze a top one hundred or one thousand of the search results 214 provided by the search engine 210. The search engine 210 can provide the search results 214 to the search results tool module 218 in an ordered list and/or with ranking information that indicates a confidence level for the matching of each search result with the search query 204.

In one example of analysis, the search results tool module 218 can analyze the number of search results for each type of content. The search results tool module 218 determines that a particular type of content has at least a threshold number of search results and/or a threshold percentage of a total number of search results across the content types. As a result of the determination, the search results tool module 218 identifies a tool for filtering the search results 214 to include only search results of the particular content type as being relevant to the search results 214.

Where the search results tool module 218 identifies multiple content type filter tools, the search results tool module 218 can determine an order for the content type filter tools. In some implementations, the search results tool module 218 determines the order for the tools based on the relative numbers and/or percentages of the search results for each content type. For example, the search results tool module 218 can place an identified content type filter tool having a highest number or percentage of search results at the top of a list of identified content type filter tools. The search results tool module 218 can place an identified content type filter tool having a lowest number or percentage of search results at the bottom of the list of identified content type filter tools. In some implementations, the search results tool module 218 determines the order for the tools based on the frequency with which the tools were previously selected for the query, either by the user currently requesting the query or an aggregate of other users' selections of the tools for that query.

In some implementations, where the search results tool module 218 determines that a particular type of content, such as product content, has at least a threshold number of search results and/or a threshold percentage of a total number of search results across the content types, instead of or in addition to identifying a content type filter tool, the search results tool module 218 can identify a fewer sites tool for the particular type of content as being relevant to the search results 214. The fewer sites tool can reduce the number of search results of that particular type of content that are included in the search results. In some implementations, the fewer sites tool eliminates all of the search results of the particular content type. For example, where a large number of search results for product or shopping web sites exist, the fewer-shopping-sites tool can be used to reduce the number of search results for shopping related sites. In some implementations, the search results tool module 218 identifies the relevancy of the fewer sites tool based on the number of product search results in a top portion of the search results 214, such as the first ten, the first one hundred, or the first page of displayed search results. In some implementations, the search results tool module 218 identifies a tool, such as the fewer sites tool, as being relevant to the search results based on a top portion of the search results 214 including a particular range of search results of a particular type. For example, the search results tool module 218 can determine that the top ten search results include a number of product search results between six and eight. As a result, the search results tool module 218 identifies the fewer-shopping-sites tool as being relevant to the search results.

In addition, the search results tool module 218 can identify a more sites tool as being relevant to the search results 214 where the search results tool module 218 determines that a threshold number or percentage of product search results occur at a position that is lower than a top portion of the search results 214. For example, where product search results are primarily on pages or portions of the search results 214 that are not currently being displayed, a more-shopping-sites tool can be used to elevate one or more of the product search results to the first page or an otherwise higher position in the search results 214. In some implementations, the search results tool module 218 determines if a hypothetical selection of the more-shopping-sites tool would raise a threshold number of product search results onto a top portion of the search results 214, such as the first page of the search results 214. For example, the search results tool module 218 can determine that a threshold number, such as at least two, of the product search results occur at a position or positions in the search results 214 other than a top portion of the search results 214. The search results tool module 218 also determines that selection of the more-shopping-sites tool would raise the threshold number of product search results from the position or positions other than the top portion to the top portion, such as the first page. As a result, the search results tool module 218 identifies the more-shopping-sites tool as being relevant to the search results.

In another analysis example, the search results tool module 218 can analyze the dates associated with the search results 214 to determine if a threshold number and/or percentage of the search results 214 having date information occur within a threshold time range. For example, the search results tool module 218 can determine that a cluster of the search results 214 for "transformers" related to the third movie in the TRANSFORMERS series occur within three days from the present time. In response to the determination, the search results tool module 218 identifies a time range filter tool with a time range of the past three days as being relevant to the search results 214. A user can invoke the time range filter tool to display only those search results that have a date that is within the past three days.

For example, the search results tool module 218 can step through a top portion of the search results, such as the first fifty, one hundred, or two hundred, and identify search results whose content or metadata indicate a particular date. In some implementations, the search results tool module 218 only identifies dates that have a threshold level of confidence, such as a particular number of occurrences in the content or metadata, an occurrence in a particular location within the content or metadata, or in association with particular content or metadata that identifies the information as date information. If the search results tool module 218 identifies a threshold number of search result dates, such as three, five, or ten, then the search results tool module 218 determines that the range of identified dates, and the corresponding time range filter tool, is relevant to the search results. The search results tool module 218 can use a maximum time range when identifying time ranges, such that time ranges greater than the maximum time range are not identified as relevant to the search results. In another time range example, the search results tool module 218 can identify a bounded range for the time range filter tool as opposed to a past range of time from the present, such as a cluster of search results for reviews that occurred during the opening week of the first TRANSFORMERS movie.

In determining that the time range filter tool is relevant, the search results tool module 218 can apply a minimum threshold date to the search results 214. For example, this can prevent the search results tool module 218 from identifying the time range filter tool for search result dates that are before the threshold date, such as one month or one year before the present time.

In some implementations, if the search results tool module 218 determines that the search results 214 include dates clustered about more than one time range or dates across a wide time range, then the search results tool module 218 identifies a timeline tool as being relevant. The timeline tool displays a histogram of the search results over time. In some implementations, the search results tool module 218 determines that the time range filter tool and/or the timeline tool are relevant by identifying a peak in numbers of search results for a particular date. The search results tool module 218 can also base the determination on identifying a particular standard deviation of search results around the peak.

In another analysis example, the search results tool module 218 can store a history 222 of user tool selections for various search queries. The search results tool module 218 can then lookup the search query 204 in the list of previously processed search queries to determine how often each of the tools were selected in the past for that query. The search results tool module 218 can determine that a particular tool has at least a threshold number of user selections and/or a threshold percentage of user selections across the set of tools. In response to the determination, the search results tool module 218 identifies the particular tool as being relevant to the search results 214. For example, if the search results tool module 218 determines that a particular tool has been selected more often than other tools, such as twice as often, then the search results tool module 218 identifies the particular tool as being relevant to the search results 214. In some implementations, the search results tool module 218 applies a minimum threshold of user selections to the determination. For example, if the search results tool module 218 determines that a tool has been selected a threshold number of times, such as two, five, or ten, and the tool has been selected more often than other tools, then the search results tool module 218 identifies the particular tool as being relevant to the search results 214.

The search results tool module 218 provides the search results 214 and an indication of the tools 220 that were identified to a response formatter 224. The response formatter 224 generates a search results page 226. The search results page 226 includes a list of search results and a list of the tools 220 that were identified as relevant. In some implementations, the search results page 226 does not list tools that were not identified as being relevant to the search results 214. Where non-relevant tools are hidden, the search results page can include a control that a user can select to request that the hidden tools be displayed. In some implementations, the response formatter 224 presents the tools 220 identified as relevant more prominently than tools that were not identified as being relevant. For example, the tools 220 can be presented at a higher position in a list of tools than the non-relevant tools. The tools 220 can be presented in a bolder or larger font size than the non-relevant tools. The response formatter 224 outputs the search results page 226 through the interface 202 to the computing device that sent the search query 204. A user can then select a control on the search results page 226 to invoke a corresponding tool to manipulate the search results 214.

Figure 3A:
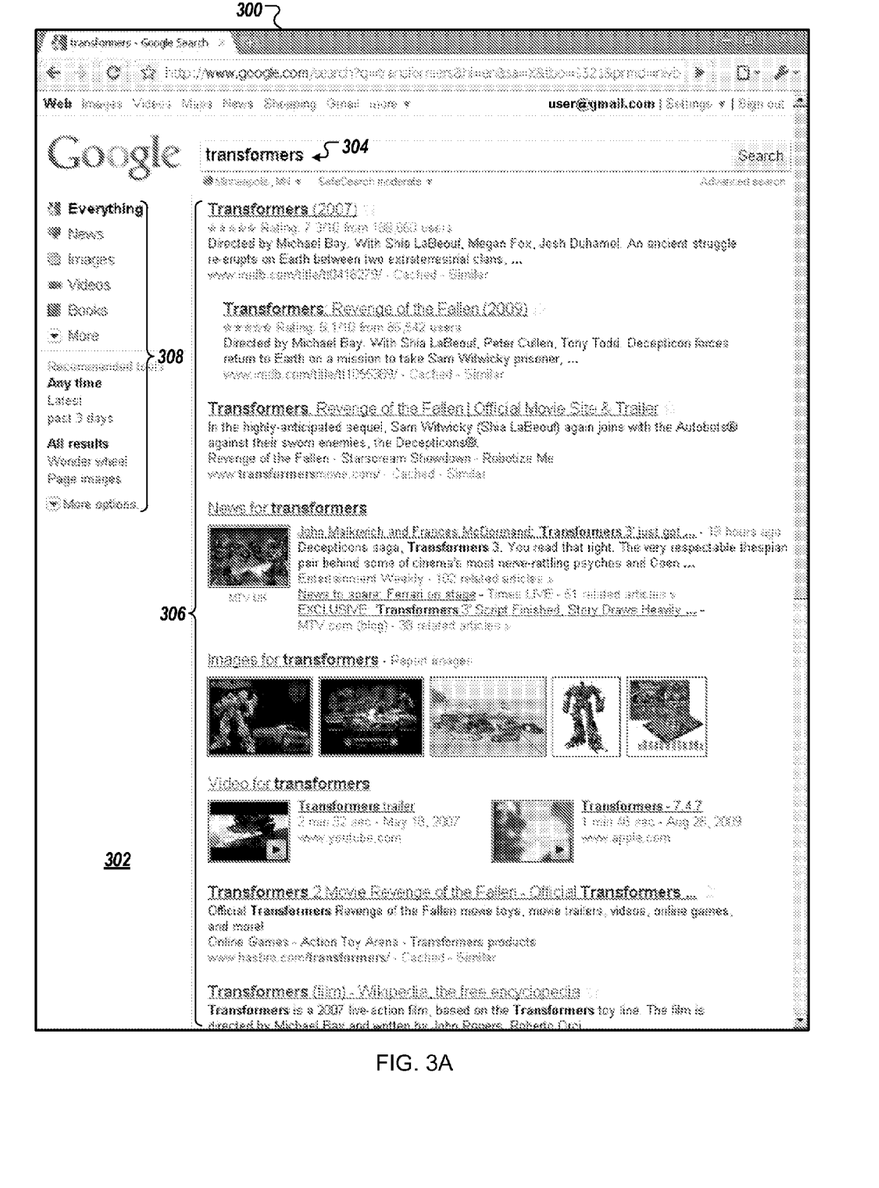
FIGS. 3A-C show examples of graphical user interfaces for presenting search results tools.

FIG. 3A is an example of a graphical user interface 300 for presenting search results tools. The user interface 300 presents a search results page 302 for a search query 304. The search results page 302 includes a list 306 of search results and multiple controls 308 for the identified search results tools. The search results tools identified as being relevant to the search results include news, images, videos, and books content type filter tools, latest and past-three-days time range filter tools, a wonder wheel tool, and a page images tool. A user can select one or more of the controls 308, such as the control for the past-three-days time range filter tool or the control for the wonder wheel tool, to manipulate the list 306 of search results.

Figure 3B:
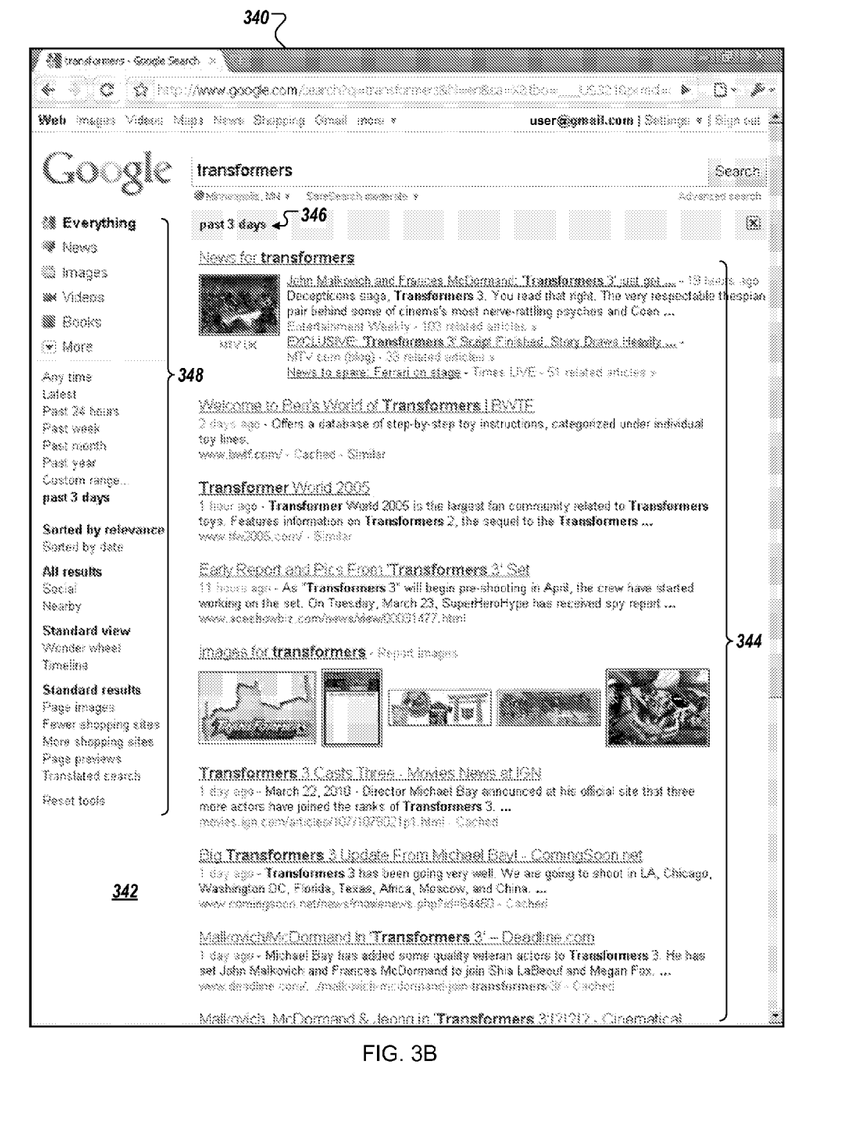

FIG. 3B is an example of a graphical user interface 340 for a time range tool. The user interface 340 includes a search results page 342. In response to a user selection of the control for the past-three-days time range filter tool, the search system updates a list 344 of search results on the search results page 342 to include only search results that have dates from the past three days. The search results page 342 also includes an indication 346 that the past-three-days time range filter tool has been applied to the search results. The search results page 342 again includes multiple controls 348 for the identified search results tools. The search system updates the identified controls based on the newly filtered list of search results. For example, the search results in the list 344 all have date information, accordingly the search system identifies the sorted by date tool as being relevant to the list 344 of search results.

Figure 3C:
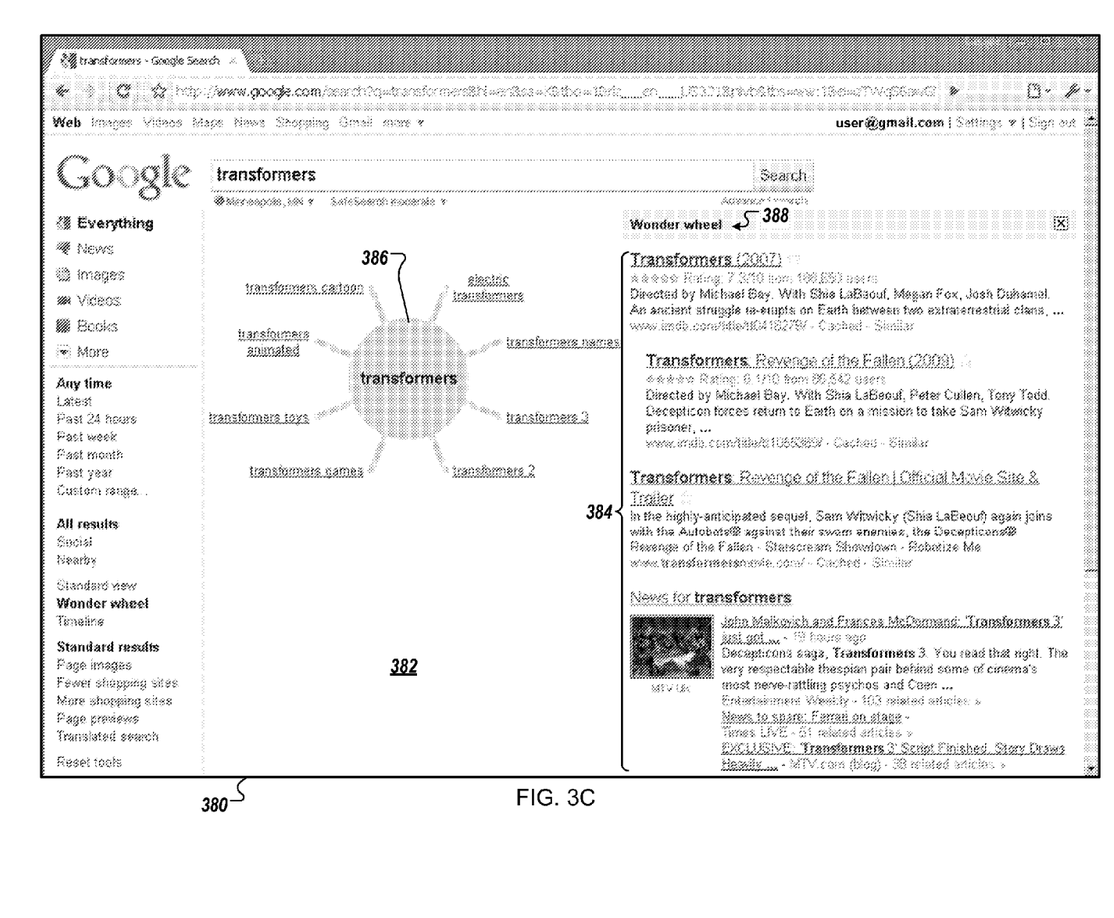

FIG. 3C is an example of a graphical user interface 380 for a wonder wheel tool that displays related queries. The user interface 380 includes a search results page 382 and a list 384 of search results. In response to a user selection of the control for the wonder wheel tool, the search system inserts a graph 386 of related queries into the search results page 382. The search results page 382 also includes an indication 388 that the wonder wheel tool is active. A user can select a related query in the graph 386, such as "electric transformers," to request search results for the related query. The search system then updates the list 384 to include search results for the related query and also updates the graph 386 to include queries that are related to the query for "electric transformers."

Figure 4:
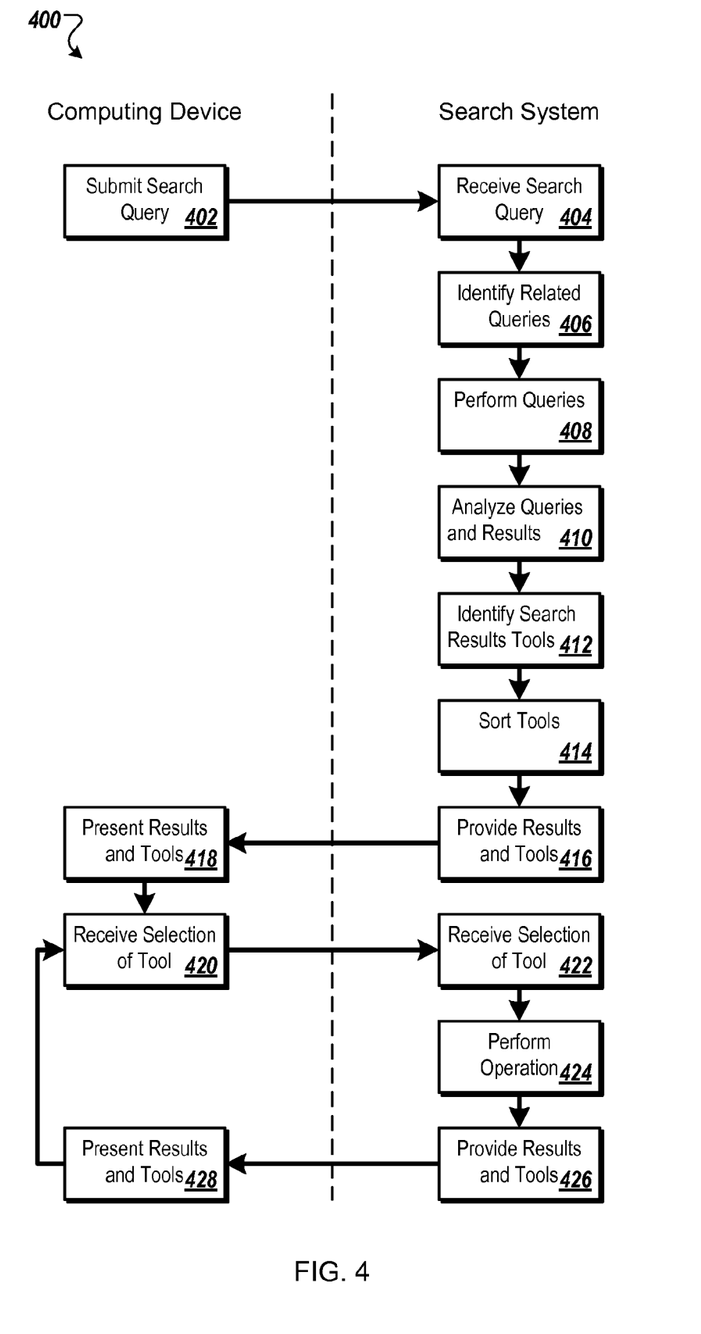
FIG. 4 is a flow chart that shows an example of a process for providing search results tools.

FIG. 4 is a flow chart that shows an example of process 400 for identifying and providing search results tools. The process 400 may be performed, for example, by a system such as the system 100 and the search system 200. For clarity of presentation, the description that follows uses the system 100 and the search system 200 as examples for describing the process 400. However, another system, or combination of systems, may be used to perform the process 400. The process 400 begins with a computing device submitting (402) a search query to a search system. For example, a user may enter a search query for "transformers" at the computing device 102 and the computing device 102 can submit the search query to the search system 104.

The search system receives (404) the search query and, in some implementations, identifies (406) related queries. For example, the search system 200 can receive a search query for "transformers" and identify related queries, such as "transformers toys," "transformers cartoon," and "electric transformers."

The search system performs (408) a search using the search query to identify search results and, in some implementations, performs a search using one or more of the related queries to identify corresponding sets of search results for the related search queries. For example, the search engine 210 can perform searches on content in the index 212 using the search queries for "transformers," "transformers toys," "transformers cartoon," and "electric transformers."

The search system analyzes (410) the search query and the search results. For example, the search results tool module 218 can analyze the history 222 for the query to identify, for each search results tool, a number of times that the search results tool has previously been selected for the "transformers" query. In another example, the search results tool module 218 can analyze dates, if available, to identify one or more ranges of dates that have a cluster of search results for the query "transformers," such as media buzz for the past three days over casting for the third TRANSFORMERS movie. In another example, the search results tool module 218 can analyze content types of the search results to identify, for each content type, a number of occurrences in the search results and locations of one or more clusters of the content type in the search results. In yet another example, the search results tool module 218 can analyze search results of related queries to identify related queries that have a significant number of non-overlapping search results (e.g., "electric transformers" has a significant proportion of search results that are not included in the search results for "transformers cartoon").

Based on the analysis, the search system determines (412) that one or more search results tools are relevant to the search results. For example, the search results tool module 218 can determine that the date-range-filter tool is relevant where a cluster of search results are identified at a particular range of dates. In another example, the search results tool module 218 can determine that the timeline tool is relevant where multiple clusters of search results are identified at multiple ranges of dates or where dates of search results occur over a range of dates that has at least a threshold length. In another example, the search results tool module 218 can determine that one or more tools are relevant where each of the tools has been previously selected a threshold number of times for the query. In another example, the search results tool module 218 can determine that one or more content type filter tools are relevant where each of the content types for the tools has a threshold number or proportion of occurrences in the search results.

In some implementations, the search system sorts (414) the search results tools. For example, where the search results tool module 218 determines that multiple tools of a particular type, such as a content filter type or a date range filter type, are relevant, then the search results tool module 218 can sort the type of tools according to the relevance of each tool. The search results tool module 218 can, for example, sort the content type filter tools according to the number of search results of each content type. The search results tool module 218 can sort the date range filter tools according to the number of search results in each cluster of dates.

The search system provides (416) the search results and one or more controls that correspond to the search results tools to the computing device. For example, the response formatter 224 can generate or obtain code for a web page. The code comprises instructions that can include markup language, scripts, (e.g., JAVASCRIPT, JAVA), or combinations of these, for presenting the search results and the controls in a web browser at the computing device, for example.

The computing device receives (418) the search results and the controls, and presents the search results and the controls to a user. The computing device receives (420) a selection of at least one of the controls from the user and sends a request to the search system to perform an operation for the search results tool associated with the selected control. In some implementations, the search system provides code to the computing device for performing the operation, such as in the code for presenting the search results and the search results tools. For example, in response to receiving the user selection of the control, the computing device can execute the code previously received from the search system to perform the operation.

The search system receives (422) the selection of the control for the search results tool. The search system performs (424) an operation for the search results tool associated with the selected control. The operation can modify the list of search results or the format in which the search results are presented. For example, the search results can be filtered based on a date range or a type of content. In another example, a visual representation can be added to or replace the search results, such as a timeline of search results or a wonder wheel that includes related queries. In some implementations, the search system reanalyzes the search query and the search results in response to performing the operation. For example, after filtering the search results based on a date range, the search system can analyze the search results to identify a significant portion of the search results, such as more than half or more than ninety percent, have associated date information. As a result, the search system determines that the sort-by-date search results tool is relevant to the search results.

The search system again provides (426) the search results and the controls to the computing device. The computing device then presents (428) the received search results and the controls to a user. In some implementations, one or more steps in the process 400 can be repeated and/or performed in a different order than previously described. For example, a user may input a selection of an additional search results tool and the search system can perform the operation associated with the selected tool and provide the search results and the controls to the computing again. In another example, the search system can perform the steps of analyzing the search results and the search query again after performing an operation associated with a search results tool.

Figure 5:
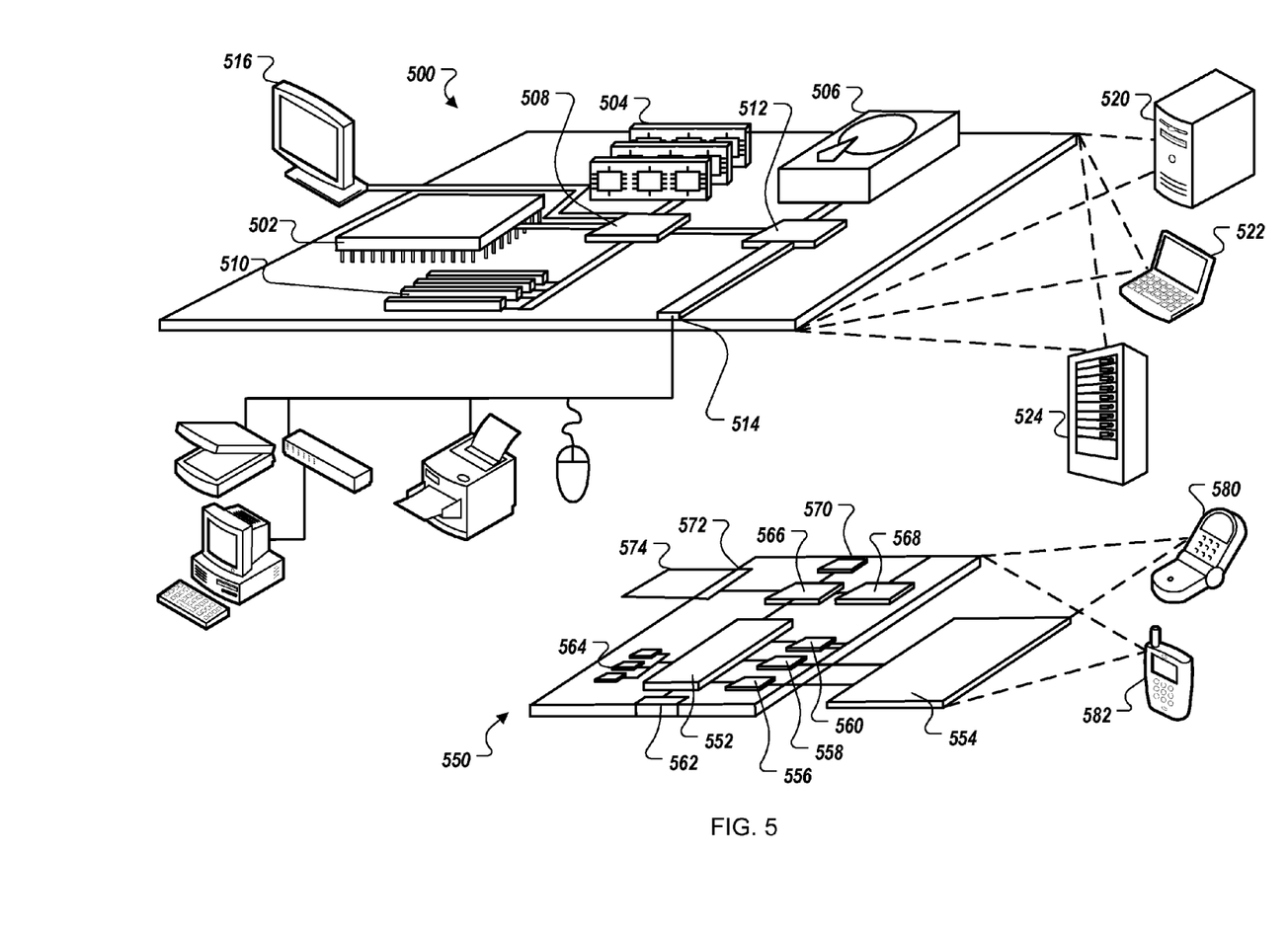
FIG. 5 is a schematic diagram that shows an example of a computing device and a mobile computing device.

FIG. 5 shows an example of a computing device 500 and an example of a mobile computing device that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a microdrive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that the no personally identifiable information can be determined for the user, or a user's geographic location may be generalized where location information is obtained (such as to a city, zip code, or state level), so that a particular location of a user cannot be determined.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system, comprising:
   a computer-readable medium that stores instructions; and
   data processing apparatus configured to execute the instructions and perform operations comprising:
      receiving a search query;
      obtaining an ordered list of search results responsive to the search query, wherein the ordered list includes at least one search result of each of a plurality of different types;
      determining that one or more tools, from a set of multiple tools for manipulating the search results, are relevant to the search query or the search results, wherein the one or more tools include a tool for, after the search results are presented in the ordered list, adjusting positions of search results of a particular type of the plurality of different types in the ordered list of the search results, and wherein determining that the tool for adjusting positions of search results of the particular type is relevant comprises;
      determining that at least a threshold number of search results of the particular type occur in a pre-determined portion of the ordered list of the search results; and
      obtaining, in response to the determination that the one or more tools are relevant to the search query or the search results, code for presenting user interface controls with the search results, wherein selection of a particular presented user interface control results in performance of an operation corresponding to a particular tool for manipulating the search results.

2. The system of claim 1, the operations further comprising providing a search results page including the code to a computing device.

3. The system of claim 1, wherein determining that at least the threshold number of search results of the particular type occur in the pre-determined portion of the ordered list of the search results comprises determining that at least the threshold number of the particular type of search result occur at positions below a threshold position in the ordered list, and wherein the tool is configured to move one or more search results of the particular type to a position above the threshold position in the ordered list.

4. The system of claim 1, wherein determining that at least the threshold number of search results of the particular type occur in the pre-determined portion of the ordered list of the search results comprises determining that at least the threshold number of search results of the particular type occur at positions above a threshold position in the ordered list, and wherein the tool is configured to move one or more search results of the particular type to a position below the threshold position in the ordered list.

5. The system of claim 1, wherein a search result of the particular type is a search result that links to content of the particular type.

6. A computer-implemented method comprising:
receiving a search query;
obtaining an ordered list of search results responsive to the search query, wherein the ordered list includes at least one search result of each of a plurality of different types;
determining that one or more tools, from a set of multiple tools for manipulating the search results, are relevant to the search query or the search results,
wherein the one or more tools include a tool for, after the search results are presented in the ordered list, adjusting positions of search results of a particular type of the plurality of different types in the ordered list of the search results, and wherein determining that the tool for adjusting positions of search results of the particular type is relevant comprises:
determining that at least a threshold number of search results of the particular type occur in a pre-determined portion of the ordered list of the search results; and
obtaining, in response to the determination that the one or more tools are relevant to the search query or the search results, code for presenting user interface controls with the search results, wherein selection of a particular presented user interface control results in performance of an operation corresponding to a particular tool for manipulating the search results.

7. The method of claim 6, further comprising providing a search results page including the code to a computing device.

8. The method of claim 6, wherein determining that at least the threshold number of search results of the particular type occur in the pre-determined portion of the ordered list of the search results comprises determining that at least the threshold number of the particular type of search result occur at positions below a threshold position in the ordered list, and wherein the tool is configured to move one or more search results of the particular type to a position above the threshold position in the ordered list.

9. The method of claim 6, wherein determining that at least the threshold number of search results of the particular type occur in the pre-determined portion of the ordered list of the search results comprises determining that at least the threshold number of search results of the particular type occur at positions above a threshold position in the ordered list, and wherein the tool is configured to move one or more search results of the particular type to a position below the threshold position in the ordered list.

10. The method of claim 6, wherein a search result of the particular type is a search result that links to content of the particular type.

11. A non-transitory computer-readable medium storing instructions that when executed by one or more computers cause the one or more computers to perform operations comprising:
receiving a search query;
obtaining an ordered list of search results responsive to the search query, wherein the ordered list includes at least one search result of each of a plurality of different types;
determining that one or more tools, from a set of multiple tools for manipulating the search results, are relevant to the search query or the search results,
wherein the one or more tools include a tool for, after the search results are presented in the ordered list, adjusting positions of search results of a particular type of the plurality of different types in the ordered list of the search results, and wherein determining that the tool for adjusting positions of search results of the particular type is relevant comprises:
determining that at least a threshold number of search results of the particular type occur in a pre-determined portion of the ordered list of the search results; and
obtaining, in response to the determination that the one or more tools are relevant to the search query or the search results, code for presenting user interface controls with the search results, wherein selection of a particular presented user interface control results in performance of an operation corresponding to a particular tool for manipulating the search results.

12. The computer-readable medium of claim 11, the operations further comprising providing a search results page including the code to a computing device.

13. The computer-readable medium of claim 11, wherein determining that at least the threshold number of search results of the particular type occur in the pre-determined portion of the ordered list of the search results comprises determining that at least the threshold number of the particular type of search result occur at positions below a threshold position in the ordered list, and wherein the tool is configured to move one or more search results of the particular type to a position above the threshold position in the ordered list.

14. The computer-readable medium of claim 11, wherein determining that at least the threshold number of search results of the particular type occur in the pre-determined portion of the ordered list of the search results comprises determining that at least the threshold number of search results of the particular type occur at positions above a threshold position in the ordered list, and wherein the tool is configured to move one or more search results of the particular type to a position below the threshold position in the ordered list.

15. The computer-readable medium of claim 11, wherein a search result of the particular type is a search result that links to content of the particular type.

* * * * *